C. GOBELL.
TALLY KEEPER FOR HAY PRESSES.
APPLICATION FILED SEPT. 30, 1910.

1,007,780.

Patented Nov. 7, 1911.
2 SHEETS—SHEET 1.

Witnesses:

Inventor:
Claud Gobell,
Attorney

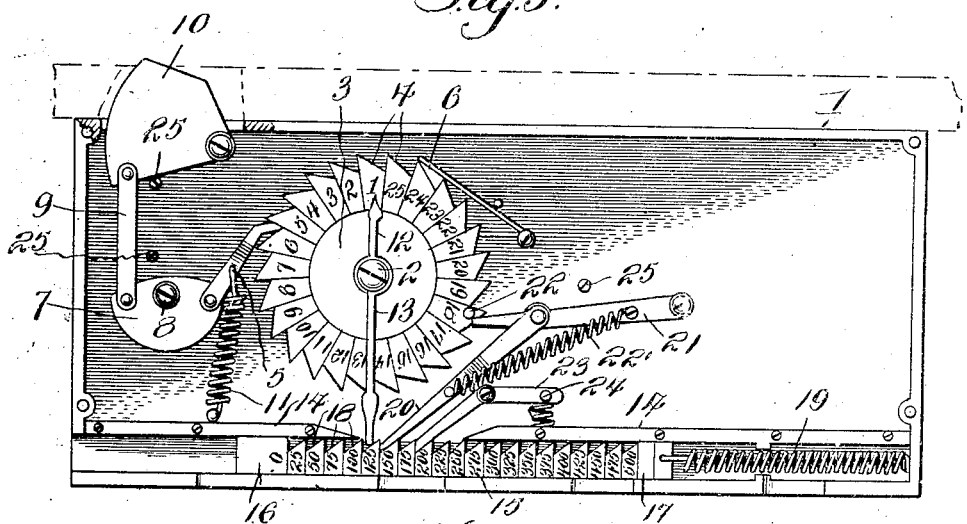
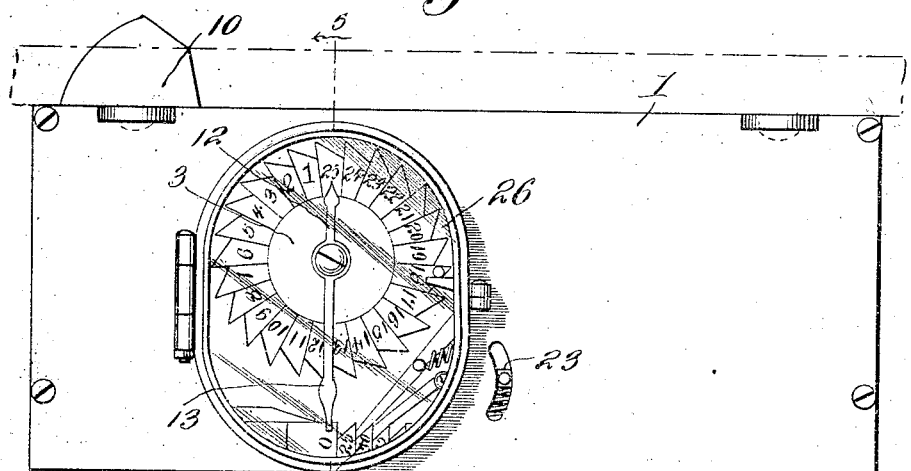
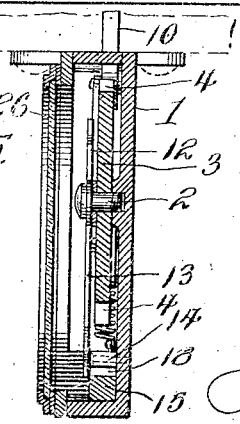

UNITED STATES PATENT OFFICE

CLAUD GOBELL, OF QUINCY, ILLINOIS, ASSIGNOR OF ONE-HALF TO CHARLES J. KEPPNER, OF QUINCY, ILLINOIS.

TALLY-KEEPER FOR HAY-PRESSES.

1,007,780.

Specification of Letters Patent.     Patented Nov. 7, 1911.

Application filed September 30, 1910.   Serial No. 584,636.

*To all whom it may concern:*

Be it known that I, CLAUD GOBELL, a citizen of the United States, residing at Quincy, in the county of Adams and State of Illinois, have invented certain new and useful Improvements in Tally-Keepers for Hay-Presses, of which the following is a specification.

This invention relates to a tally keeper or indicator for steam, gasolene or horse power hay presses or balers, the object of the invention being to provide a simple, reliable, compact and inexpensive type of device for keeping an accurate record of the number of bales made by a press, which device is applicable to the various makes of hay presses in common use.

The invention consists of the novel features of construction, combination and arrangement of parts, hereinafter fully described and claimed, reference being had to the accompanying drawings, in which:—

Figure 1:
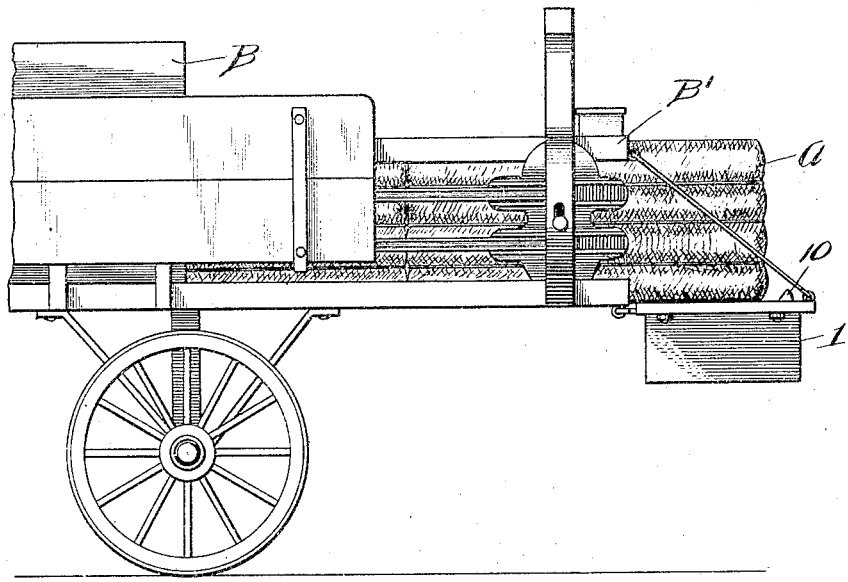
Figure 2:
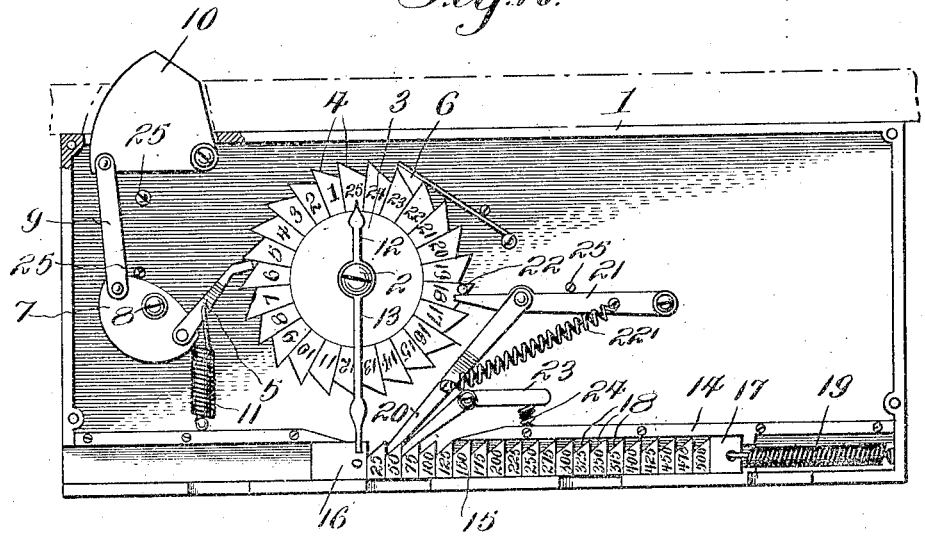

Figure 1 is a view in side elevation, showing one mode of applying the invention to one form of baling press. Fig. 2 is a front view of the device with the cover of the casing removed and the parts in starting position. Fig. 3 is a similar view, showing the slide and disks at the moment of completing a transfer of motion from one to the other. Fig. 4 is a front view of the device with the cover in position. Fig. 5 is a transverse section on line 5—5 of Fig. 4.

Referring to the drawings, 1 designates the longitudinally extending and vertically disposed inclosing box or casing of the tally keeper or indicator, which may be of any preferred construction and applied for use upon the baling press in any suitable way.

In practice, the casing is arranged so as to lie beneath each bale A as it discharges from the outlet end B′ of the compression chamber B of the machine, so that the bale on its passage will engage and actuate the trip member of the indicating mechanism, but any suitable relationship of the parts to secure the stated result may be employed.

Mounted within the casing to rotate upon a stationary transverse shaft 2 is a primary indicator 3, comprising a rotary wheel or disk provided upon its outer face with an annular series of indicating numerals, from 1 to 25, inclusive, extending in a counterclockwise direction. Said disk or wheel is also provided with an annular series of ratchet teeth 4 for coöperation with a dog 5 and spring-actuated detent 6, operating, respectively, to turn the disk the distance of one tooth at a time and to hold the disk against retrograde movement.

The dog 5 is pivotally connected with one side or end of a lever 7, pivoted intermediately upon a fulcrum pin or bolt 8, and the opposite side or end of which is coupled by a link 9 with an actuating device or trip member 10. The member 10 consists of a sector plate vertically movable edgewise in a slot in the top of the casing, said plate being arranged at the outer or rear end of the casing and pivoted at its forward end or vertex portion, as shown, the construction and arrangement being such that the upper inclined edge of the trip member will lie in the path of the discharging bale A. As a result, the bale on its outward movement will depress the trip member, thus shifting the lever 7 and actuating the dog 5 to turn the disk the distance of one tooth. When the bale clears the trip member, a spring 11, connected with the dog 5, returns said lever and the dog and trip member to normal position. Carried by the shaft 2 are upwardly and downwardly extending hands or pointers 12 and 13, the former of which always points to the numeral in vertical alinement with said shaft and at the highest point in the path of rotation of the disk.

At its base the casing 1 is provided with a longitudinal guideway 14, perforated at intervals in its bottom for the discharge of any dirt or refuse which may enter therein. Slidably mounted in said guideway is a secondary indicator 15 comprising a bar having terminal solid guide portions 16 and 17 and an intermediate scale portion, the last named being formed in its upper edge with ratchet teeth 18. The end portion 16 bears a zero (cipher) mark, as shown, while the end portion 17 is connected with the casing by a retracting spring 19, and the scale portion bears a longitudinal series of numerals disposed in alinement with the ratchet teeth. These numerals range from 25 to 500, the intermediate numerals increasing regularly at the rate of 25 from end to end of the series. Any other suitable arrangement of the numerals on the disk and bar may, however, be employed. A pivotally mounted dog 20 is provided to engage the ratchet teeth 18 and feed the bar the distance of one tooth forward on each complete rotation of the disk. This dog 20 is pivotally connected with a trip member 21 fulcrumed upon the casing, which trip member is adapted to be engaged and depressed by a contact pin 22 on the disk, said pin being so disposed as to lie in contact with the member 21 when the hand 12 is in registry with the numeral "25" on the face of the disk and to trip said member 21 when the disk is turned to bring the next succeeding numeral "1" into registry with the hand. A spring 22' connects said feed dog 20 with said trip member 21 and maintains the dog in normal position, the engagement of the dog with the teeth of the indicator bar holding the trip member in position for coaction with the pin 22. A pivoted bell-crank pawl or detent 23, yieldingly held in operative position by a spring 24, is provided to engage the ratchet teeth 18 and hold the bar from retraction by the spring 19. Stops 25 are properly arranged to limit the movements of parts 7, 10 and 20. The disk, hands and a portion of the indicator bar are exposed to view through a transparent panel 26 in the front or outer side of the casing, which may be provided with suitable openings or removable portions for access to the casing to adjust, set or repair the parts as occasion requires.

It will be understood from the foregoing description that each time a bale is formed and discharged the member 10 will be depressed and actuate the primary feed dog, whereby the disk will be turned the distance of a single tooth, the hand 12 pointing out the total number until the disk has made one complete revolution, up to which time the hand 13 points to the zero mark on the indicator bar. Upon the discharge of the twenty-sixth bale and the movement of the disk to bring the numeral "1" into registry with the hand 12, the contact pin 22 engages and actuates the secondary feed dog 20, which will move the indicating bar up the distance of one tooth, thus bringing the first numeral "25" on the bar into registry with the hand 13. The bar will then be held from motion until another lot of twenty-five bales are formed, when it will be moved up another step in the manner before described. The number of bales which have been formed up to and within any certain time after starting may, therefore, be determined by reference to the numeral to which the hand 12 points, if less than twenty-five have been formed, or by adding together the numbers to which both hands 12 and 13 point, if more than twenty-five have been formed, which, of course, an inspection of the face of the indicator will immediately show. In the form of embodiment disclosed the indicator will register up to five hundred, through a very simple and compact construction and arrangement of parts, but the indicating range of the device may vary as desired. When the bar has been moved up to its extreme limit and the numeral 500 registers with the hand 13, the detents may be retracted to allow the disk to be reset to starting position by hand while the bar is restored to starting position by its retracting spring.

I have not regarded it necessary to show any special way of applying the device to any special make of machine, but by variations in the mode of securing the casing in position the device may be applied with equal facility to any and all of the hay presses in common use.

Having thus fully described my invention, what I claim as new and desire to secure by Letters Patent of the United States, is:—

1. An indicator of the character described comprising an indicating wheel provided with ratchet teeth, an indicating slide provided with ratchet teeth, pointers coöperating with said indicating wheel and slide, a bale-actuated member, a dog operated thereby for turning said indicating wheel, a spring for retracting the slide, a dog for holding the slide from retrograde movement, a dog for shifting said slide, and a trip carried by the indicating wheel for actuating the third named dog on each complete rotation of said wheel.

2. An indicator of the character described comprising a casing, a ratchet wheel provided with a series of indicating numerals thereon, a dog for intermittently turning said ratchet wheel, a pivoted bale-actuated trip-member, a pivoted lever, links pivotally connecting the lever with the trip member and dog, a ratchet slide provided with indicating numerals thereon, indicators coacting with the wheel and slide, and a dog operated on each revolution of the ratchet wheel to shift the ratchet slide.

3. An indicator of the character described comprising a casing, a ratchet wheel provided with a series of indicating numerals thereon, a pivotally mounted dog for intermittently turning said ratchet wheel, a bale-operated trip member, an actuating lever connecting said trip member with the dog, a ratchet slide provided with indicating numerals thereon, a dog for actuating said slide, indicators coöperating with the wheel and slide, a second trip member connected with the second-named dog, and a projection upon the wheel to periodically engage said second trip member to actuate said second-named dog.

4. An indicator of the character described comprising a casing, a ratchet wheel provided with a series of indicating numerals thereon, a dog for intermittently turning said ratchet wheel, a bale-operated means for actuating the dog, a ratchet slide provided with indicating numerals thereon, a dog for actuating said slide, a pivoted trip lever carrying said dog, a projection upon the wheel to periodically engage and move the lever to actuate the dog, and indicators coöperating with the wheel and slide.

5. An indicator of the character described comprising a casing, a ratchet wheel provided with a series of indicating numerals thereon, a dog for intermittently turning said ratchet wheel, bale-operated means for actuating the dog, a ratchet slide provided with indicating numerals thereon, a dog for actuating said slide, a spring for returning the slide to normal position, a detent adapted to permit forward movement of the slide and hold the same from retraction, indicators coöperating with the wheel and slide, and a projection upon the wheel to periodically engage and actuate the second-named dog.

In testimony whereof I affix my signature in presence of two witnesses.

CLAUD GOBELL.

Witnesses:
GERALD M. FINLEY,
JOHN F. GARNER.